F. DAVIS.
HOSE COUPLING.
APPLICATION FILED DEC. 8, 1909.
994,723.
Patented June 13, 1911.
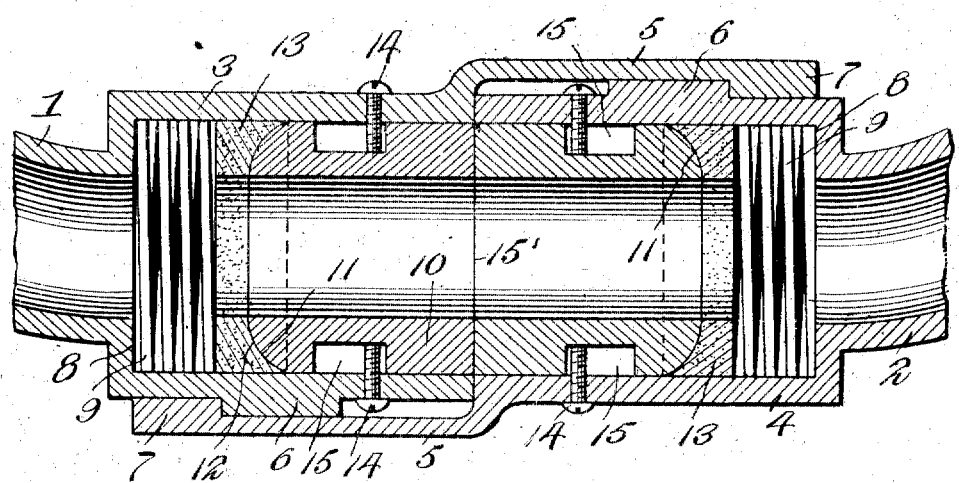
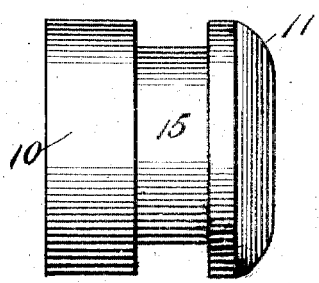
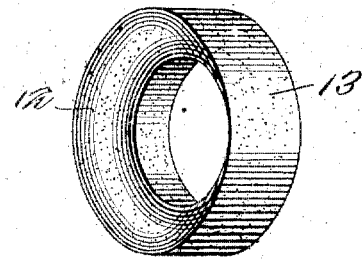
Witnesses
Hugh H Ott
P. M. Smith
Inventor
Frank Davis
By Victor J. Evans
Attorney

UNITED STATES PATENT OFFICE.

FRANK DAVIS, OF ATLANTA, GEORGIA.

HOSE-COUPLING.

994,723.  Specification of Letters Patent.  Patented June 13, 1911.

Application filed December 8, 1909. Serial No. 531,986.

*To all whom it may concern:*

Be it known that I, FRANK DAVIS, a citizen of the United States, residing at Atlanta, in the county of Fulton and State of Georgia, have invented new and useful Improvements in Hose-Couplings, of which the following is a specification.

This invention relates to hose coupling, the main object of the invention being to provide a device of the character referred to especially adapted for coupling together the sections of steam or vacuum hose used on railway trains, the primary object of the invention being to produce a steam and vacuum air-tight joint where the hose sections are coupled together so as to effectually prevent leakage.

With the above and other objects in view, the nature of which will more fully appear as the description proceeds, the invention consists in the novel construction, combination and arrangement of parts as herein fully described, illustrated and claimed.

In the accompanying drawing:—Figure 1 is a longitudinal section through a pair of coupling heads, illustrating the present invention. Fig. 2 is a plan view of one of the movable contact elements or plungers. Fig. 3 is a detail perspective view of one of the packing rings.

Referring to the drawings, 1 and 2 designate adjoining hose receiving sections provided respectively with coupling heads 3 and 4, each of which has a longitudinally extending arm 5 having an inwardly projecting lug 7 at its end which is adapted to interlock with the lug 6 projecting from the side of the opposite coupling head. The lugs on the arms and heads are adapted to be turned into interlocking engagement with each other by pressing the heads together when the lugs 7 and 6 are out of alinement and rotating the heads in opposite directions. When in contact with each other the lugs 6 and 7 are adapted to hold the coupling heads closely together, as illustrated in Fig. 1.

Each of the coupling heads is of larger diameter both externally and internally than the adjacent hose receiving sections 1 or 2, as the case may be, as shown in Fig. 1, thereby providing a rear internal annular shoulder 8 against which bears one end of a coil spring 9 the purpose of which is to hold the respective plunger or contact element against the corresponding element of the other coupling head. Each coupling head also contains a longitudinally movable plunger or joint-forming element 10, which has a general cylindrical shape, as shown in Fig. 2 and is mounted to slide easily and snugly within the bore of the coupling head.

The inner end of the plunger or joint-forming element is provided with a convex face 11 which rests in contact with the correspondingly concaved face 12 of a packing ring 13 preferably formed of asbestos or other suitable material to adapt the coupling, as a whole, for steam purposes. The opposite or outer face of the packing ring 13 is flat and receives pressure from the adjacent end of the coil spring 9 heretofore referred to. The outward movement of the element 10 may be restricted or limited by one or more stop screws 14 inserted through the coupling head and having the inner ends thereof arranged in an annular recess or groove 15 in the outer periphery of the member 10. This prevents the member 10 from being pushed out of the coupling head when uncoupled.

From the foregoing description, taken in connection with the accompanying drawing, it will be seen that a perfectly tight joint is obtained between the packing ring 13 and the inner wall of the coupling head and also between said packing ring and the adjacent end of the joint-forming element or plunger 10 which effectually prevents leakage of air, steam or vacuum. The meeting faces 15 of the members 10 are ground so as to produce a perfectly tight metallic joint, said meeting faces being held tightly in contact with each other by the action of the springs 9 at and within the inner ends of the coupling heads.

I claim:—

A coupling comprising a pair of coupling heads having a cylindrical bore and internal annular shoulders, joint-forming members slidably and rotatably mounted in the heads and having convex inner faces and external annular channels, packing rings having concaved faces to engage the convex faces of the joint-forming members, a spring interposed between the packing members and the shoulders to hold the packing ring in engagement with the joint-forming members and the joint forming members normally projected, a pair of screws entering the casing and projecting into the annul. channel and adapted to limit the movement of the joint-forming member but permitting its rotary movement, said joint-forming members having ground contacting faces, and means to connect the heads together, said means covering one of the limiting screws and preventing its disengagement.

In testimony whereof I affix my signature in presence of two witnesses.

FRANK DAVIS.

Witnesses:
  GEO. S. RUSSEY,
  A. G. STEINHEIMER.